United States Patent Office
2,998,426
Patented Aug. 29, 1961

2,998,426
CERTAIN AMINE, CYANO PYRAZOLES
Clifford L. Dickinson, Jr., and Blaine C. McKusick, Wilmington, Del., assignors to E. I. du Pont de Nemours and Company, Wilmington, Del., a corporation of Delaware
No Drawing. Filed Nov. 2, 1959, Ser. No. 850,060
7 Claims. (Cl. 260—310)

This invention relates to new aminopyrazoles having an acyl group on nuclear nitrogen and further substituents on adjacent nuclear carbons.

Although many 5-membered heterocyclic ring systems having two heteroatoms occur in natural products, the pyrazole ring system, i.e., compounds having adjacent nuclear nitrogens, is a product of synthesis. Pyrazoles have an interesting and relatively stable ring.

There has now been synthesized a new class of pyrazoles, namely, 1-acylpyrazoles, having an amino group (or substituted amino group) as represented by the Formula I (or its isomer Formula II) as follows:

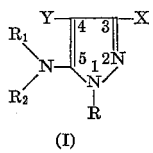

(I)

and

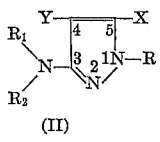

(II)

wherein R is an acyl radical, $R_1$ and $R_2$ are members of the class consisting of hydrogen, hydrocarbyl, and substituted hydrocarbyl (including acyl), X and Y are monovalent radicals, of which one is selected from the group of substituents having nitrogen, sulfur, or carbon atoms attached to nuclear carbon, said atoms being multiply bonded to a member of the class consisting of oxygen and nitrogen, and the remaining X or Y-position being satisfied by a member of the class consisting of sulfonyl, sulfonamide, acyl, hydrocarbylthio, dihydrocarbylamino, halogen and nitro groups.

The new compounds, or their precursors, are obtained by reaction of a hydrazide with a tetrasubstituted ethylene having from one to two cyano groups and the remaining positions satisfied by sulfonyl, sulfonamide, acyl, hydrocarbylthio, dihydrocarbylamino, halogen, or nitro groups. Up to one carbamyl and carbalkoxy group can be present in the X or Y-position of the ethylene which can be represented by the formula:

wherein X and Y are as previously specified and wherein Z can be CN or the same as X or Y. Ethylenes in which Z is CN and X and Y are sulfonyl are fully described and claimed in the copending application of Elmore L. Martin, Serial No. 849,733, filed October 30, 1959, and entitled "Chemical Products."

The hydrazide compounds have the formula $RNHNH_2$ wherein R is a monovalent radical directly attached to nitrogen through an acyl group. The hydrazide compounds are those which are stable and do not have groups present that react with a cyanoethylene under the reaction conditions.

Since the new products of this invention or their precursors are formed by reaction of a hydrazide (including semicarbazides) with a tetrasubstituted ethylene containing one to two cyano groups in equimolar quantities, the two starting materials are preferably present in substantially equivalent amounts. Larger amounts of one of the reactants can be present but the molar ratio should be between 1:1.5 and 1.5:1 of the hydrazide to the ethylenic compound.

The reaction takes place in liquid phase and an inert diluent or solvent is employed. Suitable diluents or solvents are those that are nonreactive and from which the new pyrazoles can be readily separated by crystallization from the solvent or the diluent removed by vaporization. The amount of solvent is dependent upon the reactants. Suitable diluents or solvents are the lower alkanols, such as methanol, ethanol, or butanol; ethers such as dioxane and tetrahydrofuran; esters, e.g. ethyl acetate; acids, e.g., acetic; and amides such as dimethylformamide.

The reaction makes no unusual requirements as to temperature and time. Temperatures of 0–100° C. can be used but it is preferred the temperature be kept below 50° C. The time is dependent upon the temperature and times of from a few minutes to several hours are generally employed.

The pyrazoles thus obtained are removed from the diluent by filtration from or evaporation of the solvent. Any further purification, if desired, can be effected through conventional crystallization techniques.

The pyrazoles of our invention are high melting crystalline compounds that are generally white to pale yellow in color. In general, they are relatively inert and stable at high temperatures.

The new compounds of this invention or their derivatives have an affinity for proteinaceous material. This is further illustrated by the attachment of aldehyde derivatives of the 5-aminopyrazoles to wool further shown as follows:

When a solution of 1 g. of 5-amino-1-carbamyl-3-cyano-4-p-toluenesulfonylpyrazole, 0.5 g. of p-dimethylaminobenzaldehyde, and 0.05 g. of p-toluenesulfonic acid in 10 ml. of ethanol was refluxed three hours and allowed to cool, 0.5 g. of a yellow precipitate of the 5-p-dimethylaminobenzalamino compound, M.P. 183–185° C. (dec.), was obtained. This was used for dyeing wool and silk fabrics a yellow color as follows: A solution of 0.02 g. of "Marasperse CB" (a partially desulfonated sodium lignin sulfonate dispersing agent) in 70 ml. of water, a drop of acetic acid, and 0.02 g. of the above p-dimethylaminobenzaldehyde derivative in 1.0 ml. of dimethylformamide was heated on the steam bath for fifteen minutes with the fabric.

In contrast to the deep yellow color provided by the above specific compound, dyes of different specific characteristics are provided by other products of this invention since the varying negative groups in the 3- and 4-positions can be changed as desired.

Other orange dyes are obtained from aminopyrazoles of this invention by adding a solution of the aminopyrazole to nitrosylsulfuric acid (prepared from sodium nitrite and sulfuric acid), keeping the temperature below 20° C. The resulting solution is coupled with a β-naphthol by adding the solution to a strongly alkaline solution of β-naphthol. There results an orange dye.

The following detailed description further illustrates new compounds of this invention and their preparation.

EXAMPLE I

*5-amino-3-cyano-1,4-bis(p-toluenesulfonyl)pyrazole*

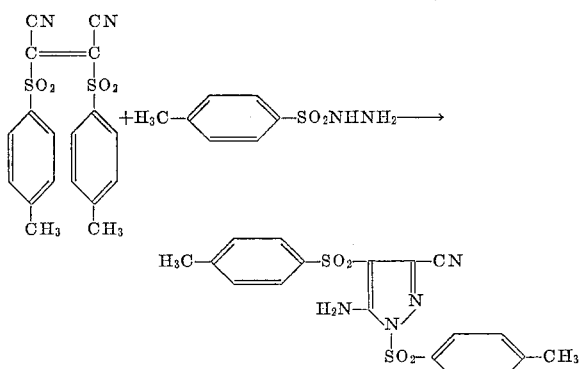

A mixture of 1.90 g. of 1,2-dicyano-1,2,-bis(p-toluenesulfonyl)-ethylene and 0.90 g. of p-toluenesulfonylhydrazide in 25 ml. dimethylformamide was heated on a steam bath for one hour and diluted with 25 ml. of water. The 5-amino-3-cyano-1,4-bis(p-toluenesulfonyl)-pyrazole was collected and recrystallized from ethanol, M.P. 207.5–209° C.

Analysis.—Calcd. for $C_{18}H_{16}N_4O_4S_2$: C, 51.9; H, 3.8; N, 13.5; S, 15.4. Found: C, 52.0; H, 4.0; N, 13.2; S, 15.4.

The 1,2-dicyano-1,2-bis(p-toluenesulfonyl)-ethylene was obtained as follows: To a solution of 294 g. of dichlorofumaronitrile in 2300 g. of dimethylformamide was added in small portions 356 g. of powdered anhydrous sodium p-toluenesulfinate, the temperature being maintained at 10–20° C. The reaction mixture was diluted with cold water and the 1,2-dicyano-1,2-bis(p-toluenesulfonyl)-ethylene filtered. The compound was crystallized from methylene chloride to give 180 g. of faintly yellow needles, M.P. 245–7° C. (dec.).

Analysis.—Calcd. for $C_{18}H_{14}O_4N_2S_2$: C, 55.94; H, 3.65; N, 7.26; S, 16.58. Found: C, 56.21; H, 3.67; N, 6.78; S, 16.66.

To a suspension of 186 g. of p-toluenesulfonylhydrazide and 147 g. of dichlorofumaronitrile in 500 ml. of glacial acetic acid is added 178 g. of anhydrous sodium p-toluenesulfinate. The resulting reaction mixture is warmed slightly on a steam bath with stirring, whereupon the reaction mixture sets to a solid. To the solid reaction mixture is added 500 ml. of glacial acetic acid and the thick reaction mixture is stirred for an additional five minutes with occasional warming on a steam bath. The reaction mixture is diluted with water and the precipitate is collected by filtration, washed with water and the filter cake is crystallized from ethanol. The yield of colorless crystals melting at 208–210° C. is 320 g. and a mixed melting point with the previously prepared 5-amino-3-cyano-1,4-(p-toluenesulfonyl)pyrazole is 207–209° C.

EXAMPLE II

*5-amino-3-chloro-4-cyano-1-p-toluenesulfonylpyrazole*

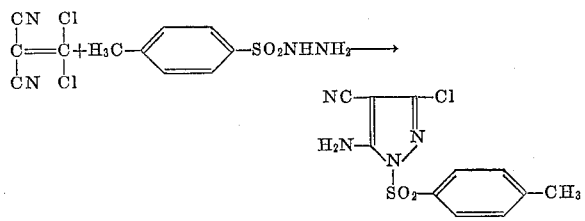

A solution of 6.88 g. of 1,1-dicyano-2,2-dichloroethylene (see U.S. 2,774,783) and 8.8 g. of p-toluenesulfonylhydrazide in 150 ml. of tetrahydrofuran was heated to boiling, and the solvent was allowed to boil off on the steam bath to yield 13.9 g., M.P. 170–189° C. The 5-amino-3-chloro-4-cyano-1-p-toluenesulfonyl pyrazole was recrystallized from ethyl acetate, M.P. 190–192° C.

Analysis.—Calcd. for $C_{11}H_{10}N_4O_2S$: C, 50.4; H, 3.8; N, 18.9; S, 10.8. Found: C, 44.6; H, 3.4; N, 18.4; S, 10.8.

EXAMPLE III

*5-amino-3-cyano-4-p-toluenesulfonyl-1-carbamylpyrazole*

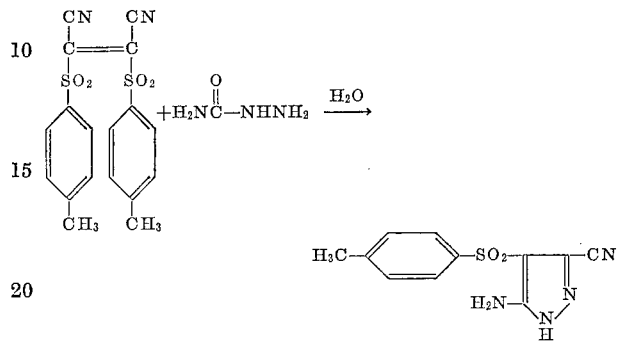

To a solution of 0.55 g. of semicarbazide hydrochloride and 0.68 g. of sodium acetate trihydrate in 25 ml. of water, was added 1.93 g. of 1,2-dicyano-1,2-bis(p-toluenesulfonyl)-ethylene (see Example I above) and 25 ml. of dimethylformamide. After one hour heating on the steam bath, 50 ml. of water was added and the crystalline 5-amino-3-cyano-4-p-toluenesulfonylpyrazole was collected and recrystallized from ethyl acetate-hexane, M.P. 230–1° C.

Analysis.—Calcd. for $C_{11}H_{10}N_4O_2S$: C, 50.4; H, 3.8; N, 21.4; S, 12.2. Found: C, 50.7; H, 3.9; N, 21.6; S, 12.2.

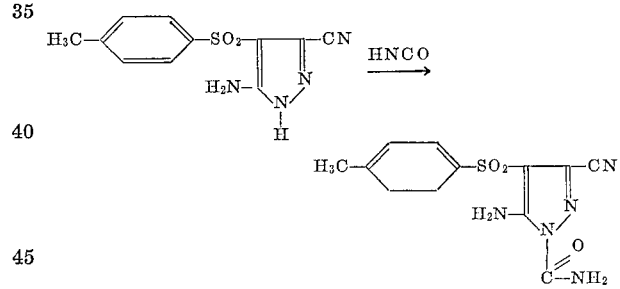

To a solution of 3.3 g. of 5-amino-3-cyano-4-p-toluenesulfonylpyrazole in 25 ml. of dry tetrahydrofuran was added 2 ml. of isocyanic acid and let stand four days. The solution was evaporated to dryness and recrystallized from ethyl acetate. The 5-amino-3-cyano-4-p-toluenesulfonyl-1-carbamylpyrazole had a melting point of 185–195° C., if heated rapidly and dec. >230° C. if heated slowly.

Analysis.—Calcd. for $C_{12}H_{11}N_5O_3S$: C, 47.2; H, 3.6; N, 23.0; S, 10.5. Found: C, 47.6; H, 3.5; N, 22.9; S, 10.6.

EXAMPLE IV

*5-amino-3-cyano-4-p-toluenesulfonyl-1-dimethylcarbamylpyrazole*

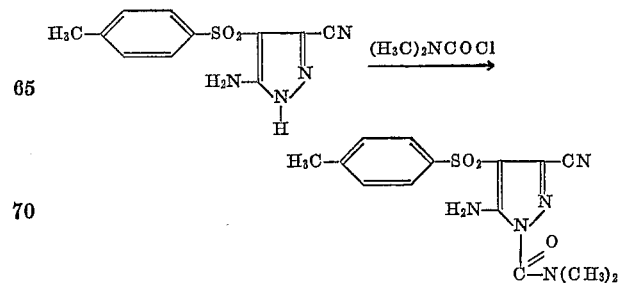

To a solution of 2.62 g. of 5-amino-3-cyano-4-p-toluenesulfonylpyrazole (see first part of Example III) in 25 ml. of tetrahydrofuran was added 1.98 g. of N,N-dimethylcarbamyl chloride and 1.01 g. of triethylamine. After two days the 5-amino-3-cyano-4-p-toluene sulfonyl-1-N,N-dimethylcarbamylpyrazole was filtered, evaporated, and recrystallized from ethyl acetate, M.P. 163–164° C.

*Analysis.*—Calcd. for $C_{14}H_{15}N_5O_3S$: C, 50.4; H,4.5; N, 21.0. Found: C, 50.1; H, 4.8; N, 21.7.

EXAMPLE V

*5-amino-3-cyano-4-methylsulfonyl-1-carbamylpyrazole*

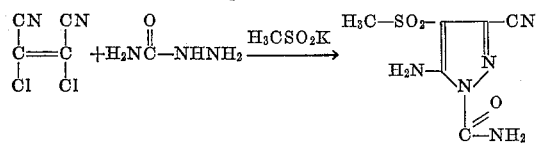

A mixture of 0.75 g. semicarbazide, 1.47 g. dichlorofumaronitrile and 1.18 potassium methyl sulfinate was treated with 10 ml. acetic acid, stirred one hour, diluted with 20 ml. of water, and filtered, yield 1.00 g. This was recrystallized from acetonitrile to give 5-amino-3-cyano-4-methylsulfonyl-1-carbamylpyrazole, M.P. 203–204° C.

*Analysis.*—Calcd. for $C_6H_7N_5O_3S$: C, 31.4; H, 3.1; S, 14.0. Found: C,32.0; H, 3.2; S, 13.7.

EXAMPLE VI

*5-amino-3-methylthio-4-cyano-1-carbamylpyrazole*

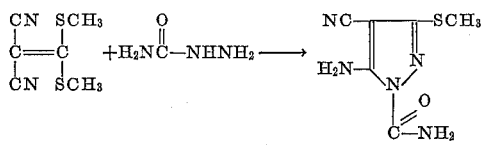

A mixture of 2.4 g. of 1,1-dicyano-2,2-bis(methylthio)-ethylene, 1.5 g. of semicarbazide and 25 ml. of absolute ethanol was allowed to stand at room temperature for 24 hours. The white microcrystalline solid that had precipitated was collected and washed with absolute ethanol to give 2.3 g. (58%) of 5-amino-3-methylthio-4-cyano-1-carbamylpyrazole, M.P. 215.5–216° C.

*Analysis.*—Calcd. for $C_6H_7N_5SO$: C,36.54; H, 3.58. Found: C, 36.58; H, 3.52.

EXAMPLE VII

*5-amino-3-methanesulfonyl-4-cyano-1-carbamylpyrazole*

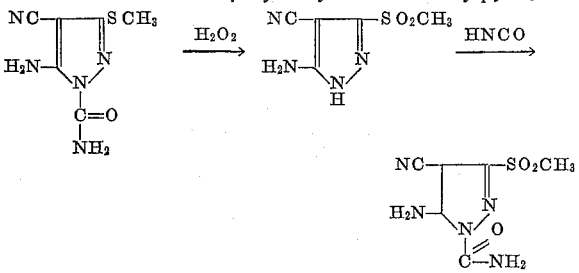

A mixture of 1 g. of isocyanic acid, 25 ml. of tetrahydrofuran and 0.9 g.′ of 5-amino-3-methanesulfonyl-4-cyanopyrazole (see below) was stirred at room temperature for 16 hours. The solid that had formed was collected to give 0.6 g. of 5-amino-3-methanesulfonyl-4-cyano-1-carbamylpyrazole which, after crystallization from acetonitrile, melted at 186–189° C. Evaporation of the liquid portion of the reaction mixture to dryness gave a solid which, after crystallization from acetonitrile, gave 0.4 g. of the pyrazole, M.P. 181–190° C. The total yield of crude material was 1.0 g. (91%). Two recrystallizations from acetonitrile increased the melting point to 190–193° C.

*Analysis.*—Calcd. for $C_6H_7N_5O_3$: C, 31.41; H, 3.08; N, 30.56. Found: C, 31.42; H, 3.00; N, 30.41.

The 3-methanesulfonyl-4-cyano-5-aminopyrazole employed as above was obtained as follows:

A mixture of 149 g. of 5-amino-3-methylthio-4-cyano-1-carbamylpyrazole (see Example VI), 1 l. of glacial acetic acid, and 210 g. of 30% hydrogen peroxide was heated under reflux for two hours and then allowed to stand at room temperature for 11 hours. The clear amber solution was seeded and cooled in ice for 0.5 hour. The solid that crystallized was collected to give 91 g. (64.5%) of crude, yellow 5-amino-3-methanesulfonyl-4-cyanopyrazole. Recrystallization of 86 g. of this crude product from water with decolorizing charcoal gave 78.2 g. of pale tan needles, M.P. 200–203° C. with softening and resolidifying at about 131° C.

*Analysis.*—Calcd. for $C_5H_6N_4SO_2$: C, 32.25; H, 3.25; N, 30.09. Found: C, 31.58; H, 3.57; N, 28.69.

Further derivatives are obtained as follows: When the general purocedure of Example II is repeated except that the hydrazine employed is 2-naphthhydrazide, 5,8-dichloro-2-naphthhydrazine, 1,4-diphenyl-2-naphthhydrazide, p-nitrophenyl acethydrazine, β-methylsulfonyl propionhydrazide, β-methylmercaptopropionhydrazide,ω-cyano-pelargonhydrazide, or β-indole-α-aminopropionhydrazide, there are obtained the following pyrazoles:

5-amino-1-(2-naphthoyl)-3-chloro-4-cyanopyrazole,
5 - amino - 1 - (5,8 - dichloro - 2 - naphthoyl) - 3 - chloro-4-cyanopyrazole,
5 - amino - 1 - (1,4 - diphenyl - 2 - naphtoyl) - 3 - chloro-4-cyanopyrazole,
5 - amino - 1 - p - nitrophenylacetyl - 3 - chloro - 4 - cyanopyrazole,
5 - amino - 1 - β - methylsulfonylpropionyl - 3 - chloro-4-cyanopyrazole,
5 - amino - 1 - β - methylmercaptopropionyl - 3 - chloro-4-cyanopyrazole,
5 - amino - ω - cyanopelargonyl - 3 - chloro - 4 - cyanopyrazole, and
5 - amino - 1 - (β - indole - α - aminopropionyl) - 3-chloro-4-cyanopyrazole.

When the general procedure of Example I is repeated except that aminoguanidine

is employed in place of the p-toluenesulfonyl hydrazide, there is obtained 5-amino-3-cyano-1-guanyl-4-p-toluenesulfonylpyrazole. The latter pyrazole when reacted with hydrogen sulfide has the imido group replaced by sulfur to yield the 5-amino-3-cyano-4-p-toluenesulfonyl-1-thiocarbamylpyrazole.

When the general procedure of Example I is repeated except that the hydrazide employed is 4-p-nitrophenylsemicarbizide, 4-(3-camphoryl)semicarbizide, and carbohydrazide, whereby there are obtained the following:
5 - amino-3-cyano-4-p-toluenesulfonylpyrazyl - 1 - p-nitrocarbanilide, 5-amino-3-cyano-4-p-toluenesulfonylpyrazyl-1-(3)-camphoramide, and 5-amino-3-cyano-4-p-toluenesulfonylpyrazyl-1-carbohydrazide.

As shown in Example III, a carbamyl group in the 1-position (i.e., on nuclear nitrogen can be removed by relatively mild hydrolysis to give hydrogen on this nitrogen. This unsubstituted position is reactive with various acylating reagents such as acyl chlorides or isocyanates to provide different desired derivatives of the 1-amino position.

Starting with available 1-acetyl-3-acetoxy-5-acetamidopyrazole, hydrolysis provides 1-acetyl-5-acetamido-3-hydroxypyrazole. The hydroxyl is replaced by chlorine upon treatment by phosphorus pentachloride. Nitration with concentrated nitric acid results in the production of 5-acetamido-1-acetyl-3-chloro-4-nitropyrazole in which the chlorine is replaced by sulfonyl or cyano with, e.g., potassium methyl sulfinate, or potassium cyanide to give 5-acetamido-1-acetyl-3-methylsulfonyl-4-nitropyrazole or 5-acetamido-1-acetyl-3-cyano-4-nitropyrazole. The latter compound upon hydrolysis of the cyano group can be converted to 5-acetamido-1-acetyl-3-carbethoxyl-4-nitropyrazole and 5-acetamido-4-acetyl-3-carbamyl-4-nitropyrazole. Treatment of the 5-acetamido-1-acetyl-3-chloro-4-nitropyrazole with silver nitrite results in the production of 5-acetamido-1-acetyl-3,4-dinitropyrazole.

When 1-acetyl-5-acetamido-3-chloropyrazole is reacted with phenyl diazonium chloride, there results 1-acetyl-5-acetamido-4-benzeneazo-3-chloropyrazole. Acetyl chloride reacts with 1-acetyl-5-acetamido-3-chloropyrazole in the presence of aluminum chloride to give 1,4-diacetyl-5-acetamido-3-chloropyrazole which upon mild oxidation with a hypochlorite gives the corresponding 4-carboxypyrazole. The latter group is converted to the carbethoxy and carbamyl groups in this compound.

A further compound within the scope of this invention is 5 - amino - 4 - cyano-1-carbamyl-3-piperidinopyrazole, which results from the action of isocyanic acid on 5-amino-4-cyano-3-piperidinopyrazole which is obtained by reaction of hydrazine upon 1,1,2-tricyano-2-piperidinoethylene.

Reaction of p-toluenesulfonylacetonitrile with carbon disulfide in the presence of potassium hydroxide gives the potassium salt of 1,1-dimercapto-2-cyano-2-p-toluenesulfonylethylene which with methyl iodide followed by reaction with hydrazine gives 5-amino-3-methylthio-4-p-toluenesulfonylpyrazole. Oxidation with hydrogen peroxide gives the corresponding 3-methylsulfonyl with which isocyanic acid reacts to give 5-amino-1-carbamyl-3-methylsulfonyl-4-p-toluenesulfonylpyrazole.

Of the above-described compounds, the compounds generally preferred for purposes of availability and utility are those having a carbamyl group in the 1-position and different substituents in the 3- and 4-positions.

The pyrazoles as obtained above and related compounds as described above have a free primary amino group in the 5-position (although in isomers this can be considered as the 3-position) of the ring. Either or both of the hydrogens of this amino group are replaced by reaction of the pyrazole with an acylating or alkylating agent, including condensation with carbonyl compounds, particularly aromatic aldehydes. Thus, when 5-amino-3-chloro-4-cyano-1-p-toluenesulfonylpyrazole is reacted with molar amounts of p-toluenesulfonyl chloride in an inert liquid diluent at a temperature of 50–100° C., there is obtained 3-chloro-4-cyano-5-p-toluenesulfonylamino-1-p-toluenesulfonylpyrazole. The same general methods can be employed to give pyrazoles having naphthalenesulfonyl on both the 1-position and the 5-amino group.

A hydrogen of the 5-amino group can likewise be replaced by an acetyl group (e.g., from acetic anhydride or acetyl chloride), benzoyl or naphthoyl groups (e.g., from benzoyl or naphthoyl chlorides), carbamyl from the reaction of carbamyl chloride on a 5-aminopyrazole, a p-acetamidobenzenesulfonyl (from p-acetamidobenzenesulfonyl chloride), thioacetyl, or thiocarbamyl.

Reaction of 5-amino-3,4-disubstituted pyrazoles with aldehydes such as butyraldehyde, cyclohexanone, benzaldehyde, and naphthaldehyde gives the corresponding condensation products of the Schiff's base type, i.e., where the 5-amino hydrogens are replaced by an $R_4CH=$ group wherein $R_4$ is an aliphatic, cycloaliphatic, or aromatic group, preferably a hydrocarbyl group. These compounds are generally colored and can be employed as dyes. These aldehyde condensation compounds can be reduced, e.g., by hydrogen in ethanol with a platinum catalyst, to give the corresponding secondary amine, i.e., compounds of Formula I where $R_1$ is hydrogen and $R_2$ is an aliphatic, cycloaliphatic, or aromatic radical.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. 5 - amino - 3 - cyano - 1,4 - bis(p - toluenesulfonyl)-pyrazole.
2. 5 - amino - 3 - cyano - 4 - p - toluenesulfonyl-1-carbamylpyrazole.
3. 5 - amino - 3 - cyano - 4 - p - toluenesulfonyl - 1-dimethylcarbamylpyrazole.
4. 5 - amino - 3 - cyano - 4 - methylsulfonyl - 1-carbamylpyrazole.
5. 5 - amino - 3 - methylthio - 4 - cyano - 1 - carbamylpyrazole.
6. 5 - amino - 3 - methanesulfonyl - 4 - cyano - 1-carbamylpyrazole.
7. A compound of the class consisting of those of the formula

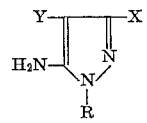

wherein R is selected from the group consisting of hydrogen, carbamyl, N,N-di(lower alkyl)carbamyl, thiocarbamyl, hydrocarbon arylsulfonyl of not more than 10 carbons, hydrocarbon aroyl of not more than 11 carbons, guanyl and n-alkanoyl of not more than 8 carbons; X and Y are monovalent radicals of not more than 7 carbons, one of which is cyano, the other is selected from the group consisting of halogen, nitro, hydrocarbon sulfonyl free of aliphatic unsaturation, lower alkylthio, lower alkanoyl, carbamyl, carboxy, lower alkoxycarbonyl and piperidyl and isomers thereof, said isomers being of the formula

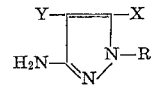

wherein R, X and Y have the same significance as above.

No references cited.

UNITED STATES PATENT OFFICE
CERTIFICATE OF CORRECTION

Patent No. 2,998,426                              August 29, 1961

Clifford L. Dickinson, Jr., et al.

It is hereby certified that error appears in the above numbered patent requiring correction and that the said Letters Patent should read as corrected below.

Column 2, line 36, for "hibh" read -- high --; column 4, line 3, for "Anaylsis.—Calcd. for $C_{11}H_{10}N_4O_2S$: C, 50.4; H, 3.8;" read -- Anaylsis.—Calcd. for $C_{11}H_9N_4SO_2Cl$: C, 44.6; H, 3.0; --; column 6, line 15, for "purocedure" read -- procedure --.

Signed and sealed this 6th day of March 1962.

(SEAL)
Attest:

ERNEST W. SWIDER                                        DAVID L. LADD
Attesting Officer                                            Commissioner of Patents